United States Patent [19]

Sigg

[11] 4,242,920

[45] Jan. 6, 1981

[54] MARINE REVERSING GEARING

[75] Inventor: Hans Sigg, Mutschellen, Switzerland

[73] Assignee: Maag Zahnräder & Maschinen AG, Zürich, Switzerland

[21] Appl. No.: 941,989

[22] Filed: Sep. 13, 1978

[30] Foreign Application Priority Data

Oct. 7, 1977 [CH] Switzerland ............... 12274/77

[51] Int. Cl.³ .................................. F16H 3/14
[52] U.S. Cl. ........................... 74/361; 74/404; 74/410
[58] Field of Search ............ 74/361, 404, 409, 410, 74/413, 414, 421 A, 665 B, DIG. 2, DIG. 5

[56] References Cited

U.S. PATENT DOCUMENTS

| 1,151,762 | 8/1915 | Day ............................. 74/361 |
| 1,662,301 | 3/1928 | Coykendall .................... 74/361 |
| 2,727,402 | 12/1955 | Thoresen ...................... 74/361 |
| 2,741,351 | 4/1956 | Fletcher et al. ............... 74/361 |
| 2,961,078 | 11/1960 | Shannon et al. ............... 74/361 |
| 2,973,845 | 3/1961 | Sinclair ........................ 74/361 |

*Primary Examiner*—Peter M. Caun
*Attorney, Agent, or Firm*—Werner W. Kleeman

[57] ABSTRACT

A marine reversing gearing having a drive shaft, a forward clutch, a forward pinion coaxially arranged with respect to the drive shaft and capable of being coupled therewith by means of the forward clutch for forward travel. Two intermediate gears continuously mesh with the forward pinion, there also being provided two intermediate pinions which are rigidly connected with a respective one of the intermediate gears. A large gear continuously meshes with both intermediate pinions. There are also provided a reverse clutch and a rearward pinion which is coaxially arranged with respect to the drive shaft and can be coupled therewith by the reverse clutch for rearward travel, and two reversing pinions are driven by the rearward pinion. The intermediate gears meshing with the forward pinion exclusively transmit power as forward gears during the forward travel. Both of the reversing pinions mesh with the rearward pinion and with a respective rearward gear, and each of both intermediate pinions also are fixedly connected with one of the rearward gears.

3 Claims, 1 Drawing Figure

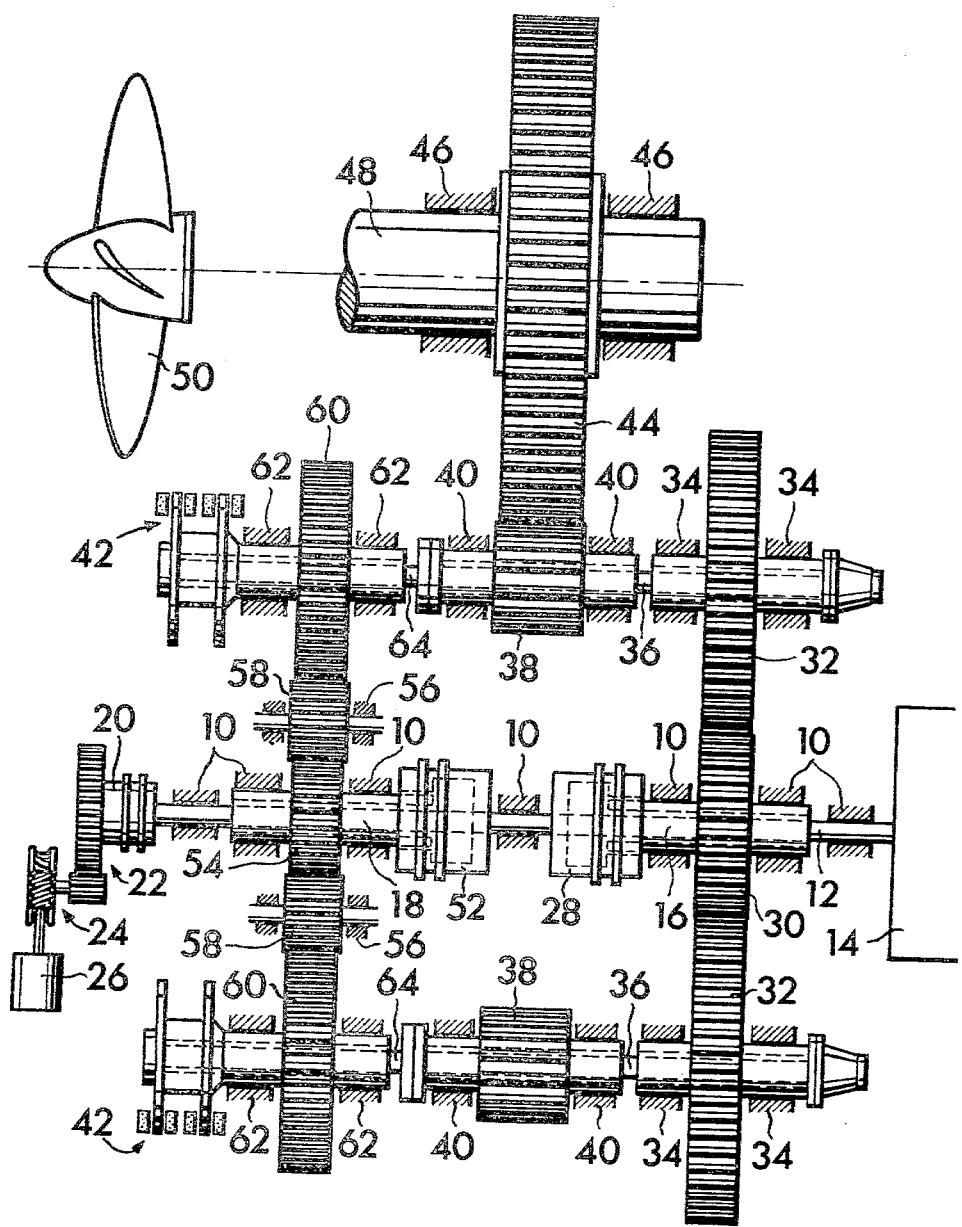

MARINE REVERSING GEARING

CROSS-REFERENCE TO RELATED APPLICATIONS

Application Ser. No. 919,045, filed June 26, 1978, contains subject matter related to this application and was filed by the same applicant and assignee herein.

BACKGROUND OF THE INVENTION

The present invention relates to a new and improved construction of marine reversing gearing or power transmission system for vessels or the like.

The marine reversing gearing of the present invention is of the type comprising a drive shaft, a forward clutch, a forward pinion arranged essentially coaxially with regard to the drive shaft and capable of being coupled therewith, during forward travel, by means of the forward clutch. There are also provided two intermediate gears which continuously mesh with the forward pinion, two intermediate pinions which are fixedly or rigidly connected with a respective one of the intermediate gears, a large gear which continuously meshes with both intermediate pinions, a reverse clutch, a rearward pinion which is coaxially arranged with regard to the drive shaft and can be coupled therewith, during rearward travel, by means of the reverse clutch, and two reversing pinions which are driven by the rearward pinion.

A prior art marine reversing gearing of this type, for instance as disclosed in U.S. Pat. No. 2,741,351, particularly FIGS. 3, 4 and 5 thereof, has the rearward pinion meshing with one of the reversing pinions and such being coupled by means of an additional clutch with the second reversing pinion. The additional clutch is always disengaged whenever the forward clutch is engaged, and is furthermore always engaged when the reverse clutch is engaged. The second reversing pinion meshes continuously with the same intermediate gears with which there also continuously mesh the forward pinion. These intermediate gears are thus provided for power transmission during rearward travel as well as during forward travel. While, however, during forward travel there is accomplished directly at the forward pinion a branching-off of the power, so that its group of gears which mesh with both of the intermediate gears only are loaded with a respective one-half of the drive power, during reverse travel there does not yet occur any branching-off of the power at the rearward pinion, since such must transmit the entire power to the first reversing pinion. The high loading of the rearward pinion and the first reversing pinion, occurring during rearward travel, renders it impossible to allow a vessel equipped with the heretofore known type of marine reversing gearing to travel rearwardly at full load or power output over a longer period of time. In the meantime vessels have been designed for fulfilling particular purposes, especially ice breakers, which throughout their period of use can travel approximately equally as long in reverse direction as in forward direction and during the rearward travel require the same drive power as during forward travel.

SUMMARY OF THE INVENTION

Therefore, with the foregoing in mind it is a primary object of the present invention to provide a new and improved construction of marine reversing gearing which is not associated with the aforementioned drawbacks and limitations of the prior art proposals.

Another and more specific object of the present invention is directed to the provision of a new and improved construction of marine reversing gearing of the previously mentioned type which with high power output can be equally suitably employed for rearward travel as well as also forward travel, and still requires extremely little space.

Yet a further object of the present invention is to provide a new and improved construction of marine reversing gearing or transmission which is relatively simple in design, quite economical to manufacture, extremely reliable in operation, not readily subject to breakdown or malfunction and requires a minimum of maintenance and servicing.

Now in order to implement these and still further objects of the invention, which will become more readily apparent as the description proceeds, the marine reversing gearing or transmission of the present development is manifested by the features that the intermediate gears, meshing with the forward pinion, exclusively transmit as forward gears the power during the forward travel. Further, both of the reversing pinions mesh both with the rearward pinion and with a respective reversing or rearward gear, and each of both intermediate pinions also are fixedly or rigidly connected with one of the reversing gears.

In this way there is achieved the beneficial result, both during rearward travel and forward travel, there occurs branching-off of the power at the pinion coupled with the drive shaft. The rearward pinion thus can have essentially the same dimensions as the forward pinion, and can be equally greatly loaded. The reversing gears which are rigidly connected with the intermediate pinions, while in comparison with the heretofore known species of transmission, constitute additional elements or components, yet however do not require any appreciable additional space, since each of them is arranged upon a common shaft with one of the related intermediate pinions and forward gears.

Continuing, it is to be noted that from German Pat. No. 1,116,106 there is also indeed known a marine reversing gearing which is equally loadable during rearward travel as during forward travel. Yet, in this case there is taught a transmission having only a single drive pinion which is continuously connected with the drive shaft. This drive pinion meshes with two intermediate gears which are rigidly connected with a respective first reversing pinion. Both of the first reversing pinions can be coupled, by means of a respective forward clutch, with a respective forward pinion which meshes with a large gear. Further, a second reversing pinion meshes with each of both first reversing pinions. The second reversing pinions can be connected by means of a respective reverse clutch with a respective rearward pinion and the rearward pinions likewise mesh with the large gear. With this known transmission there is realized the advantage that there can be accomplished power branch-off during rearward travel and also during forward travel already directly at the pinion seated upon the drive shaft. On the other hand there prevails the disadvantage that there are required two forward clutches and two reverse clutches and the number of the totality of required pinions likewise is greater than with the inventive transmission or marine reversing gearing. Therefore, also the space requirements of this state-of-the-art transmission is correspondingly great.

According to a preferred construction of the inventive marine reversing gearing both of the rearward gears have operatively associated therewith a respective brake.

For engaging and disengaging the forward and reverse clutches the drive shaft is preferably connected by means of a clutch or equivalent structure and a self-locking gearing with a slowly rotating auxiliary drive.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE of the drawing shows a preferred exemplary embodiment of marine reversing gearing or transmission constructed according to the teachings of the present invention.

DETAILED DESCRIPTION OF THE PREFERRED EMBODIMENTS

Describing now the drawing, a drive shaft 12 is rotatably mounted in a row of aligned bearings 10, this drive shaft 12 being continuously coupled with a drive unit or machine 14, for instance a gas turbine. The drive shaft 12 extends through a first hollow shaft 16 and a second hollow shaft 18. Connected with the end of the drive shaft 12 which is remote from the drive machine or unit 14 is an auxiliary drive 26, for instance an electric motor, the connection being accomplished by means of a back stop or return movement blocking device 20, a pair of spur gears 22 and a self-locking worm gearing 24.

The first hollow shaft 16 is connected, during forward travel, with the drive shaft 12 by an engaged clutch which thus in the description to follow will be referred to by way of convenience as the forward or ahead clutch 28. Attached to this hollow shaft 16 is a pinion 30 of a first gearing stage or gear train, hereinafter conveniently referred to as the forward pinion 30, which furthermore continuously meshes with two gears of the first gearing stage or gear train and designated hereinafter as the forward gears 32. These forward gears 32 are mounted essentially in parallelism with one another in a respective pair of bearings 34 or equivalent structure and are fixedly connected by means of a respective torsion shaft or bar 36 with a respective pinion 38 of a second gearing stage or gear train, these pinions 38 being referred to conveniently hereinafter as intermediate pinions 38. Both of the intermediate pinions 38 are mounted in a respective pair of bearings 40 and can be braked by a respective double disk brake 42 or equivalent structure and both mesh with a common large gear 44. This common large gear 44 is secured to a drive shaft 48 mounted in bearings 46 and is continuously connected by means of such drive shaft 48 with the propeller 50 of the ship or vessel.

The large gear 44 has been shown laterally offset in order to simplify and improve the clarity of the illustration, something which, however, should not be misleading in terms of the fact that it continuously meshes with both intermediate pinions 38.

The second hollow shaft 18 is connected with the drive shaft 12 by means of a clutch which can be used for the reverse or rearward rotation of the ship's propeller and therefore has been conveniently designated hereinafter as the reverse or rearward clutch 52. Secured to the second hollow shaft 18 is a rearward or reversing pinion 54 which meshes with two reversing pinions 58 stationarily mounted in bearings 56. Each of both reversing pinions 58, in turn, mesh with a rearward or reversing gear 60. The rearward gears 60 and the rearward pinion 54 have been shown partially covered by both of the reversing pinions 58. The rearward or reversing gears 60 are mounted essentially parallel to one another in stationary bearings 62 and are rigidly connected by means of a respective torsion shaft or bar 64 with a respective one of both intermediate pinions 38.

The mode of operation of the illustrated marine reversing gearing or transmission, constructed according to the invention will be described hereinafter based upon the example of reversal of the vessel from full travel ahead to full rearward or astern travel:

1. The drive unit 14 is placed into its idle mode, the auxiliary drive 26 is started in its forward rotational direction and the back lock or reverse or return movement blocking device 20 is prepared for automatic locking action.

2. The disk brakes 42 are engaged as soon as:
   (a) the propeller rotational speed has dropped to a predetermined value, or
   (b) there has elapsed a predetermined time.

3. When the rotational speed of the drive shaft 12 has dropped below the low rotational speed of the reverse movement blocking device 20 such engages and automatically locks.

4. As soon as the reverse movement blocking device 20 is locked, then the auxiliary drive 26 is reversed from its forward mode to its backwards or reverse mode. At the same time the synchronization mechanism of the forward clutch 28 is placed out of operation, that of the reverse clutch 52 into operation.

5. During the reverse rotation of the drive shaft 12 through about 30° the forward clutch 28 disengages.

6. As soon as the forward clutch 28 has disengaged then the auxiliary drive 26 is once again reversed and rotates the drive shaft 12 forwards. As a result, the reverse clutch 52 engages.

7. As soon as the reverse clutch 52 has completely engaged, then the auxiliary drive 26 overcomes the idling moment of the drive unit 14 and thereby relieves the locking action of the reverse movement blocking device 20, so that such can be easily disengaged. Thereafter, the auxiliary drive 26 is brought to standstill.

8. The disk brakes 42 are released. For the case that the vessel continues to still travel forward, then the propeller 50 of the vessel strives to rotate forwardly and thus to rearwardly rotate the drive unit 14. This is prevented by the stopped auxiliary drive 26 in conjunction with the self-locking gearing 24 and the reverse movement blocking device 20.

9. Now the rotational moment or torque of the drive unit 14 can be increased. As soon as it exceeds the propeller torque then the turbine begins to rotate forwardly, the reverse movement blocking device 20 releases and the propeller 50 begins to rotate backwards.

The reversal from rearwards to forwards occurs in the exact same steps, only the clutching functions of the forward and reverse clutches are interchanged.

While there are shown and described present preferred embodiments of the invention, it is to be distinctly understood that the invention is not limited thereto, but may be otherwise variously embodied and practiced within the scope of the following claims. Accordingly,

What I claim is:

1. A marine reversing gearing comprising:
   a drive shaft;
   a forward clutch;
   a forward pinion arranged substantially coaxially with respect to said drive shaft;
   said forward clutch coupling, during forward travel, said forward pinion with said drive shaft;
   two intermediate gears continuously meshing with said forward pinion;
   two intermediate pinions, each connected with one of the respective intermediate gears;
   a large gear continuously meshing with both intermediate pinions;
   a reverse clutch;
   a rearward pinion arranged substantially coaxially with respect to said drive shaft;
   said reverse coupling, during rearward travel, said rearward pinion with said drive shaft;
   two reversing pinions driven by said rearward pinion;
   a respective rearward gear;
   said intermediate gears meshing with said forward pinion constituting forward gears which exclusively transmit power during forward travel;
   said reversing pinions both meshing with said rearward pinion and with a respective one of said rearward gears; and each of both intermediate pinions being fixedly connected with one of the rearward gears.

2. The marine reversing gearing as defined in claim 1, further including:
   a respective brake provided for each of said two rearward gears.

3. The marine reversing gearing as defined in claim 1, further including:
   a slowly rotating auxiliary drive means;
   a self-locking gearing means;
   a reverse movement blocking device; and
   said drive shaft being connected by said reverse movement blocking device and said self-locking gearing means with said slowly rotating auxiliary drive means.

* * * * *